INVENTOR
ARTHUR J. FOLMAR
BY Donald F Voss
ATTORNEY

United States Patent Office 3,043,589
Patented July 10, 1962

3,043,589
CONTROL FOR INCREMENTAL DRIVE FOR
RECORD FEEDING DEVICES
Arthur J. Folmar, Endwell, N.Y., assignor to International Business Machines Corporation, New York, N.Y., a corporation of New York
Filed Mar. 27, 1961, Ser. No. 98,467
10 Claims. (Cl. 271—51)

This invention relates to control apparatus and, more particularly, to control apparatus for an incremental drive and, still more particularly, to control apparatus for a hydraulically operated incremental drive for a record feeding device.

The prime object of the invention is to provide improved control apparatus for an incremental drive which enables the same to operate in a flexible manner.

Another very important and more specific object of the invention is to provide improved control apparatus which enables an incremental drive to selectively start driving, stop driving, to drive and dwell, and to drive continuously.

The foregoing and other objects, features and advantages of the invention will be apparent from the following more particular description of preferred embodiments of the invention, as illustrated in the accompanying drawings.

*General*

Incremental drives in the past have been employed in the record card controlled accounting and like type machines. However, the control over these incremental drives was very limited. For the most part, these incremental drives were operated cyclically, such as conventional Geneva drives.

In the present invention, the incremental drive is controlled in a completely flexible manner. It can be selectively started and, when it is started, it is able to operate at one of two speeds and subsequently be changed to operate at the other speed or stop. Furthermore, control is provided so that transitions; i.e., speed changes, starting and stopping, take place in synchronism with other apparatus which is selectively operable but, when operable, operates within a fixed period of time.

The present invention is particularly suited to be incorporated in a record card punching machine. The incremental drive is adapted to drive the feed rolls for transporting the record cards relative to the punching mechanism. Since in many instances it is not necessary to punch every column in a record card, it is desirable to transport the record cards within the punch station at higher speeds when skipping fields of columns and also when transporting the record cards from the punch station.

*Detailed Description*

Figure 1:
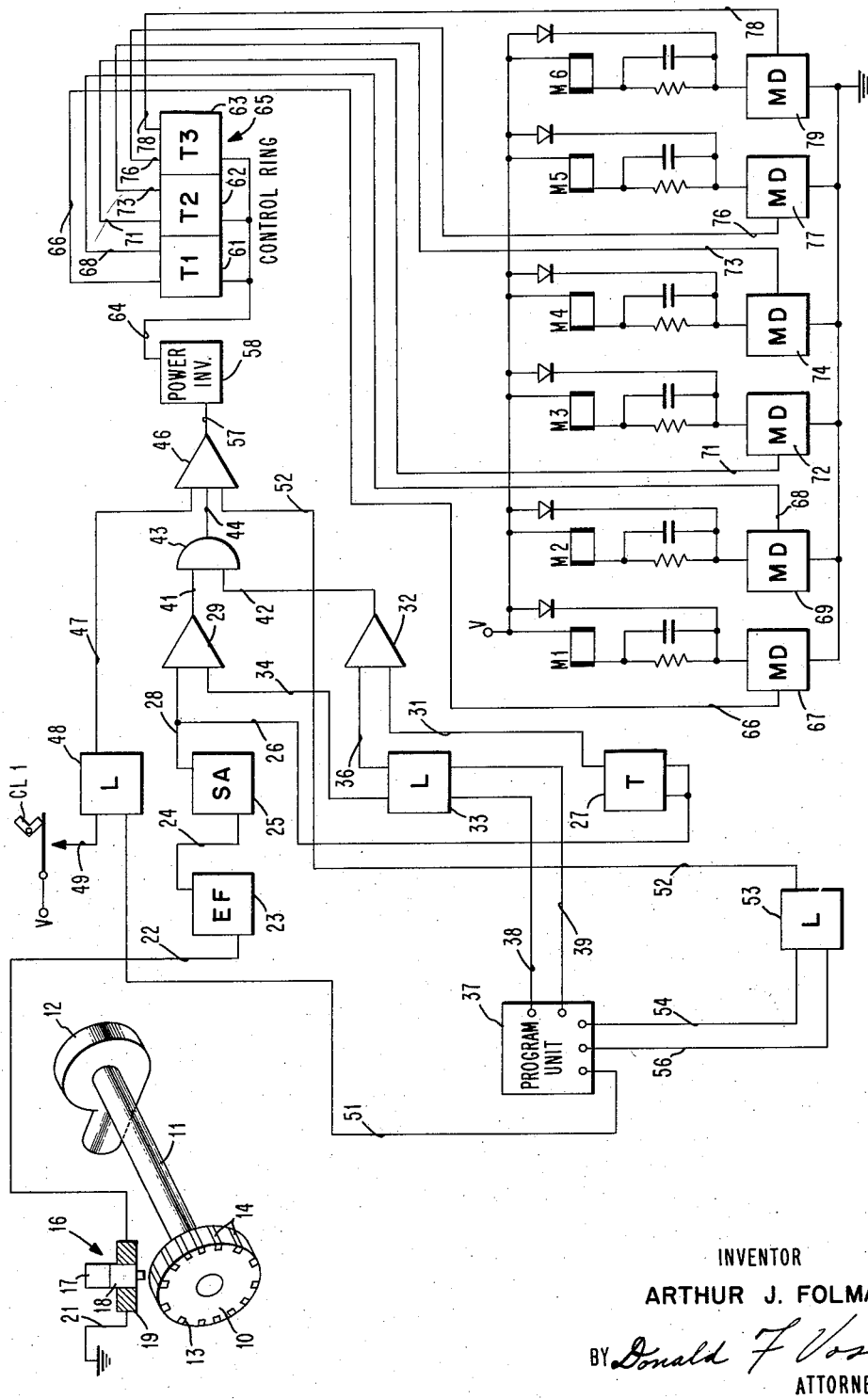
FIG. 1 is a circuit diagram schematically showing the control circuitry for an incremental drive.

Referring to the drawings, the invention, by way of example, is schematically illustrated in FIG. 1.

The electronic components shown in FIG. 1 are all the type well known in the art and therefore are represented by symbols. In FIG. 1, an emitter disk 10 is fixed to drive shaft 11 of a hydraulic pump 12 which furnishes fluid under pressure to the hydraulic incremental drive which will be described in detail hereinafter. The emitter disk 10 may take various forms and in this example it consists of a disk of nonmagnetic material having a plurality of arcuately spaced, outwardly opening slots 13. These slots 13 are filled with slugs 14 of ferromagnetic material, such as steel. A magnetic pickup head 16 is mounted in a discrete position in close proximity to the peripheral surface of the emitter disk 10. The magnetic pickup head 16 may be any suitable reluctance type pickup head such as one consisting of a permanent bar magnet 17 fixed at one end to a soft iron core 18 wound with a sufficient number of turns of wire of coil 19 for sensing the changing magnetic flux linkages. When any one of these slugs 14 of ferromagnetic material passes under the magnetic pickup head 16 at N inches per second, the reluctance of the magnetic path is momentarily reduced. This results in an increase of the lines of magnetic flux linking the turns in the coil 19 of the pickup head 16. Hence, a voltage signal is developed according to the following formula:

$$e = \frac{N d\phi}{dt}$$

where N is the number of turns of wire, $d\phi$ is the change in the number of lines of magnetic flux linking the turns of wire and $dt$ is the time involved. In this example, the emitter disk 10 is rotated at such a speed that voltage signals are developed in the coil 19 at the rate of 400 per second.

One terminal of the coil 19 is connected to ground potential by conductor 21 while the other terminal is connected by conductor 22 to the input of an emitter follower 23 having its output connected by a conductor 24 connected to the input of a shaping amplifier 25. The output of the shaping amplifier 25 is connected by a conductor 26 to both inputs of a binary trigger 27 which functions as a frequency divider. The output of the shaping amplifier 25 is also connected by means of a conductor 28 branching from conductor 26 to the input of a logical AND circuit 29.

The output of the binary trigger 27 is connected by means of a conductor 31 to the input of a logical AND circuit 32. Hence, it is seen that electrical signals occurring at the rate of 400 per second are applied to the logical AND circuit 29 while electrical signals occurring at the rate of 200 per second are applied to the logical AND circuit 32. The logical AND circuits 29 and 32 are selectively conditioned to pass the electrical signals applied thereto over conductors 28 and 31 by means of a bistable latch 33. The bistable latch or flipflop 33 has one output connected by means of a conductor 34 to the input of logical AND circuit 29 and its other output connected by a conductor 36 to the input of logical AND circuit 32. The states of the bistable latch 33 are controlled externally such as by means of a program unit 37 which may be comprised as specifically disclosed later herein or of any well-known program control such as manually operated switches, etc. The program unit 37 has one terminal which is connected by a conductor 38 to one input of the bistable latch 33 and another terminal which is connected by a conductor 39 to the other input of the bistable latch 33. Hence, when a signal from the program unit 37 is applied to conductor 38, the latch 33 will be set and thereby condition the logical AND circuit 29 to pass the signals occurring at 400 per second over conductor 28. When the latch 33 is set in its other state in response to a signal from the program unit 37 over conductor 39, the logical AND circuit 32 will be conditioned to pass signals occurring at the rate of 200 per second over conductor 31. Of course, under this latter condition, the logical AND circuit 29 will not be conditioned to pass the signals occurring at 400 per second over conductor 28 as in the former situation where the logical AND circuit 32 was not conditioned to pass the signals occurring at 200 per second when the logical AND circuit 29 was conditioned to pass the signals occurring at 400 per second.

Figure 4:
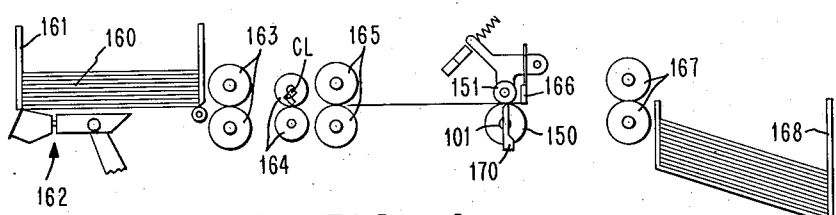
FIG. 4 is a schematic showing of a record card machine incorporating the hydraulic incremental drive and control circuit therefor.

The outputs of the logical AND circuits 29 and 32 are connected as inputs by conductors 41 and 42 to a logical OR circuit 43 having its output connected as an input by means of a conductor 44 to a logical AND circuit 46. By this arrangement, output signals from the logical AND circuits 29 and 32 will be passed by the logical OR circuit 43 to the logical AND circuit 46. The logical AND circuit 46 has two other inputs which condition the same to pass signals coming from the logical OR circuit 43. On of the other inputs is connected to a conductor 47 which is connected to the output of a latch 48. The latch 48 has a set terminal connected by a conductor 49 connected to card lever contacts CL1. The card lever contacts CL1 are located in the card path shown in FIG. 4. The card lever contacts CL1 are normally open; however, when a card is present and is ready to enter the punch station, the card lever contacts CL1 are closed by the card, thereby setting the latch 48. Of course, the latch 48 could be set by a programmed signal. The latch 48 has its reset terminal connected by a conductor 51 which connects to the program unit.

The other input of the logical AND circuit 46 is connected by a conductor 52 which connects to the output of a bistable latch 53 having its set input connected by a conductor 54 to the program unit 37 and its reset input connected by a conductor 56 to the program unit 37. The set terminal of the latch 53 is considered as a start terminal while the reset terminal is considered as the stop terminal. Hence, when the latch is set, the incremental drive may start, provided the other conditions as determined by the other inputs to the logical AND circuit 46 are met.

The output of the logical AND circuit 46 is connected by means of conductor 57 to the input of a power inverter 58. The output of the power inverter 58 is commonly connected to inputs of latches or triggers 61, 62 and 63 by means of conductor 64, the latches 61, 62 and 63 being interconnected to form a closed control ring 65. The control ring 65 functions to control the incremental drive in a manner that it will always operate in the proper direction and at the proper frequency or speed regardless whether a stop condition or change in frequency has been effected.

Each stage or latch of the control ring 65 has two outputs, one of which will be up and the other down under one condition, and the conditions being reversed when the latch is in its other state. One output of the first stage or latch 61 is connected by a conductor 66 to the input of a magnet driver 67. The magnet driver 67 may be any suitable electronic device such as a thyratron. The output of the magnet driver 67 is connected to a control magnet M1. The control magnet M1 becomes energized when the magnet driver 67 is turned on in response to a signal over conductor 66. The other output of latch 61 is connected by means of a conductor 68 to the input of a magnet driver 69. The output of the magnet driver 69 is connected to a magnet M2. The magnet M2 becomes energized when the magnet driver 69 is rendered operative in response to a signal over conductor 68.

The second stage of the control ring or latch 62 has one of its outputs connected by means of conductor 71 to the input of a magnet driver 72. The output of the magnet driver 72 is connected to a control magnet M3 which becomes energized when the magnet driver 72 is rendered operative in response to a signal over conductor 71. The other output of the latch 62 is connected by means of a conductor 73 to the input of a magnet driver 74 having its output connected to a control magnet M4 which becomes energized when the magnet driver 74 is rendered operative in response to a signal over conductor 73. The third and last stage of the control ring or latch 63 has one of its outputs connected by means of a conductor 76 to the input of a magnet driver 77, having its output connected to a magnet M5 which becomes energized when the magnet driver 77 is rendered operative in response to a signal over conductor 76. The other output of the latch 63 is connected by means of a conductor 78 to a magnet driver 79 having its output connected to a control magnet M6 which becomes energized when the magnet driver 79 is rendered operative in response to a signal over conductor 78.

The stages of the control ring 65 come on successively and only one stage is on at any one time. The control ring 65 is shown as having only three stages, and this is because the incremental drive, as will be seen later herein, has only three actuators. However, the number of stages of the control ring 65 may be increased or decreased as necessary depending upon the number of actuators for the particular incremental drive.

By this arrangement, the control ring 65 controls the state of energization of the control magnets M1, M2, M3, M4, M5 and M6. When stage 1, or latch 61, of the control ring is active, magnet M1 is energized and magnet M2 is de-energized. Magnet M3 is de-energized and magnet M4 is energized, while magnet M5 is de-energized and magnet M6 is energized. When stage 2, or latch 62, of the control ring is active, magnet M3 is energized, magnet M4 is de-energized, magnet M5 is de-energized, magnet M6 is energized, magnet M1 is de-energized and magnet M2 is energized. When stage 3, or latch 63, is active, magnet M5 is energized, magnet M6 is de-energized, magnet M1 is de-energized, magnet M2 is energized, magnet M3 is de-energized and magnet M4 is energized. The magnets M1, M2, M3, M4, M5 and M6 control the operation of the incremental drive which is to be described shortly.

Figure 2:
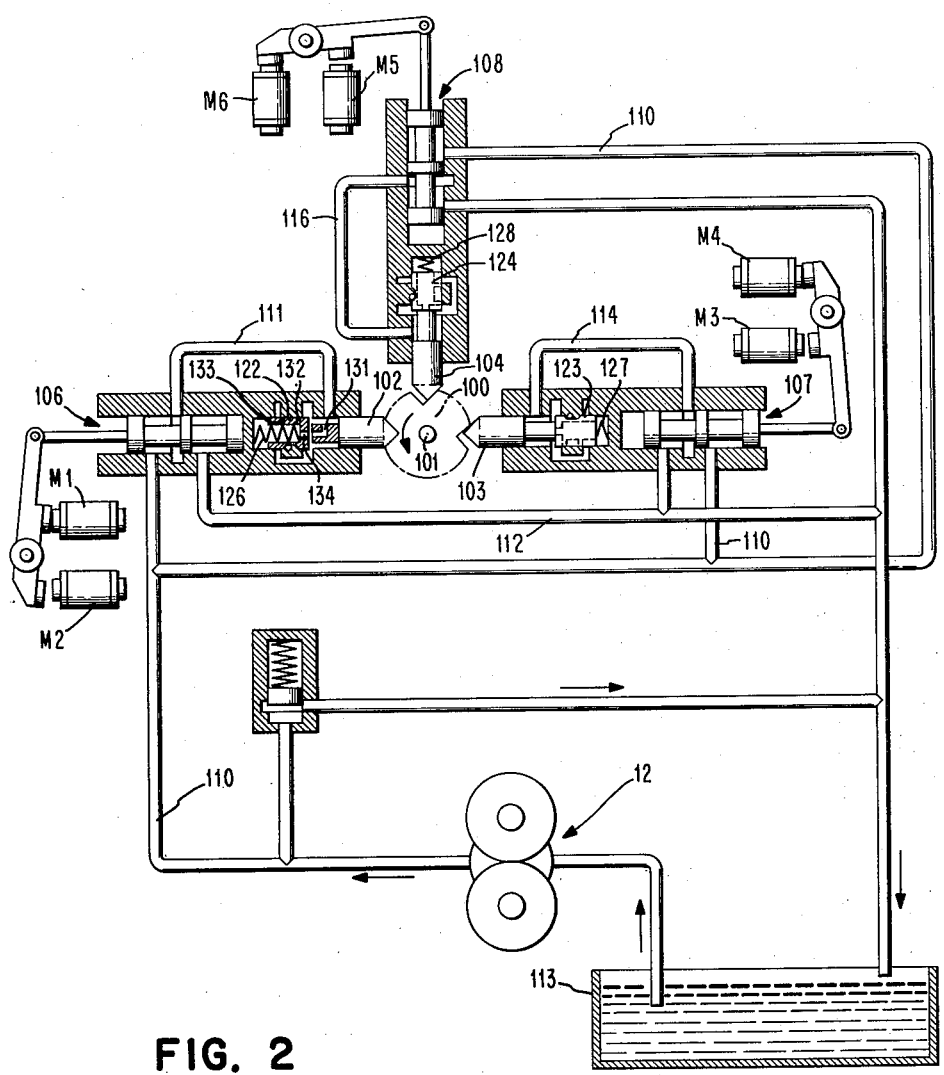
FIG. 2 is a schematic view illustrating a hydraulic incremental drive.

The incremental drive, FIG. 2, is a hydraulically operated incremental drive. The incremental drive consists of a toothed stepping wheel 100 fixed to an output shaft 101. Actuators or drive pistons 102, 103 and 104 are adapted to be successively brought into driving engagement with the toothed stepping wheel 100. The drive pistons 102, 103 and 104 are actuated by fluid under pressure which is applied to the pistons under control of magnetically operated spool valves 106, 107 and 108, respectively. The spool valve 106 is operated under control of magnets M1 and M2. When the magnet M1 is energized and the magnet M2 is de-energized, the spool valve 106 is held over to the right so that fluid under pressure coming from the pump 12 via fluid conductor 110 may pass to fluid conductor 111 which will conduct the fluid to act upon the piston 102. When the magnet M2 is energized and the magnet M1 is de-energized, the fluid conductor 111 will be connected with a fluid conductor 112 which conducts fluid to reservoir 113. The valve 107 is operated under control of magnets M3 and M4. When the magnet M4 is energized, the valve 107 is held over to the right so that fluid under pressure being conducted by fluid conductor 110 is blocked off from entering a fluid conductor 114 which functions to conduct fluid to the chamber to act upon piston 103. The fluid conductor 114, with the valve 107 held over to the right, is in fluid communication with the fluid conductor 112 for returning fluid to the reservoir 113. When the conditions of the magnets M3 and M4 are reversed; i.e., when magnet M3 is energized, M4 is de-energized, the valve 107 is held over to the left so that the fluid conductor for conducting fluid under pressure is in fluid communication with the fluid conductor 114. Under these conditions, fluid will be permitted to act upon the piston 103.

The valve 108 is under control of magnets M5 and M6. When the magnet M6 is energized and the magnet M5 is de-energized, as shown in FIG. 2, the valve 108 is held in an upward position whereby fluid conductor 110 is held out of fluid communication with a fluid conductor 116. The fluid conductor 116, under these conditions, will be in fluid communication with the fluid conductor 112 for returning fluid to the reservoir 113. When magnet M5 is energized and M6 is de-energized, the valve 108 is held in the downward position so that fluid conductor 116 is in fluid communication with fluid conductor 110, which conducts fluid under pressure. Hence, under these conditions, fluid under pressure will be permitted to act upon the piston 104.

Each piston 102, 103 and 104, when actuated, advances the stepping wheel 100. Only one of the pistons 102, 103 and 104 is driving the stepping wheel 100 at any one time. The frequency at which the magnets are energized and de-energized determines the output motion of the shaft 101. When the control magnets M1, M2, M3, M4, M5 and M6 are operated at the 200 signals per second rate, the drive pistons 102, 103 and 104 successively advance the stepping wheel 100 one increment and then dwell so as to provide intermittent rotary motion. It is during the period that the stepping wheel 100 dwells that punching will occur, as will be seen later herein. When the control magnets M1, M2, M3, M4, M5 and M6 are operated at the 400 signals per second rate, the pistons 102, 103 and 104 will be successively operated by fluid under pressure so as to continuously advance the stepping wheel to provide continuous rotary motion.

Deceleration of the stepping wheel 100 is achieved through the facility of spring-biased damping pistons 122, 123 and 124 associated with and adapted to be engaged by drive pistons 102, 103 and 104, respectively. The damping pistons 122, 123 and 124 are urged by springs 126, 127 and 128 to follow the associated drive pistons 102, 103 and 104, respectively. The movement of the damping pistons is limited by stop pins. Hence, when a drive piston reaches the end of its driving stroke, it is out of engagement with its associated damping piston. For instance, drive piston 102 is shown in FIG. 2 at the end of its stroke. The next drive piston to drive is drive piston 103. As drive piston 103 is driven by fluid under pressure, drive piston 102 is cammed out of the notch of the stepping wheel 100. After moving a given distance, the drive piston 102 engages damping piston 122. At this time, fluid trapped behind the damping piston is forced to flow through orifices 131 and 132. A decelerating torque is therefore placed upon the stepping wheel 100. As the drive piston 102 continues to move, the exposed portion of orifice 132 is gradually reduced in size and then is entirely blocked off by the cylinder wall. However, trapped fluid is still permitted to flow through orifice 131. In order to disengage the damping piston 122 from its associated drive piston 102 during the next drive cycle of the drive piston 102, an exhaust port 133 is provided. Exhaust port 133 is opened as the drive piston 102 is moved out of the notch in the stepping wheel 100. On the drive stroke of the drive pistons, the damping pistons are recharged with fluid through opening 134.

The output shaft 101 of the intermittent hydraulic drive may be connected to any member which is to be driven. In this example, the output shaft 101 is connected to drive feed roll 150 cooperating with retractable feed roll 151, as shown schematically in FIG. 4, for a record card punching machine.

Record cards 160 residing in card hopper 161 are adapted to be fed in seriatim by card picker knife 162 to a pair of cooperating feed rolls 163. The feed rolls 163 feed the cards between cooperating skid rolls 164. The record cards 160 are fed by the skid rolls 164 to another set of cooperating feed rolls 165 which feed the record cards to the feed rolls 150 and 151. The feed roll 151 is normally held out of engagement with the feed roll 150 until the record card is registered in the punch station by means of a retractable card gate 166. Upon the card being registered in the punch station, the card is fed relative to the punch 170 by the feed rolls 150 and 151. Punching takes place when the card is at rest relative to the punch 170. As the card leaves the punch station, it enters between cooperating feed rolls 167 to deliver the card to a card stacker 168. Card lever CL is located approximately at the center line through the shafts for the feed rolls 164. The card lever CL operates to close the contacts CL1 just after trailing edge of the card leaves the card lever CL. The retractable card registration gate 166 is adapted to be operated by means of a magnet, not shown.

Figure 3:
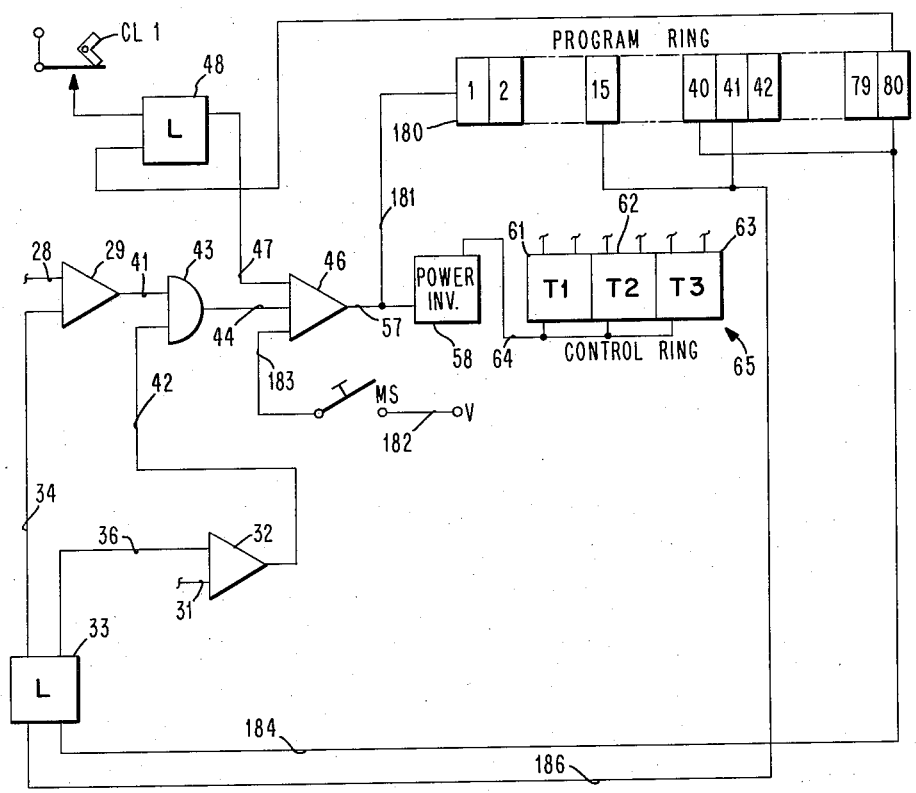
FIG. 3 is a circuit diagram illustrating another form of program control for the circuit of FIG. 1.

The program unit 37, FIG. 1, may take the form of a program ring 180, FIG. 3, and a manually operated switch MS. In this example, the program ring 180 has as many stages as there are columns to a card; i.e., 80 stages. The program ring 180 is advanced by the same impulses which advance the control ring 65. The input of the program ring is connected by means of a conductor 181 which connects to the conductor 57 connecting to the output of logical AND circuit 46. A manually operated switch MS, FIG. 3, may be substituted for latch 53, FIG. 1. One terminal of the switch MS, FIG. 3, is connected by conductor 182 to a voltage supply V while the other terminal of the switch MS is connected by a conductor 183 to the input of logical AND circuit 46. Essentially, conductor 183, FIG. 3, replaces conductor 52, FIG. 1. The inputs to latch 33 are connected by conductors 184 and 186 which connect to various stages of the program ring 180. The last or 80th stage of the program ring 180 is connected to reset the latch 48. The connections to the logical AND circuits 29 and 32 remain the same.

By this arrangement, when the switch MS is closed, the control ring 65 will be advanced at a rate determined by the program ring 180. The outputs of the program ring can be connected to conductors 184 and 186 as desired.

*Mode of Operation*

The hydraulic pump 12, FIG. 2, runs continuously to supply fluid under pressure over conductor 110. With the control valves 106, 107 and 108 in the positions shown in FIG. 2, there will be no motion of the stepping wheel 100 at this particular instant. Stage 1, or latch 61, of the control ring will be active. Assume here that the switch MS, FIG. 3, has been closed or that the program unit 37, FIG. 1, has furnished an impulse over conductor 54 to set the latch 53. Hence, logical AND circuit 46 will be conditioned to pass signals. Further, assume that logical AND circuit 29 has been conditioned by latch 33 to pass signals occurring at the rate of 400 per second.

The first signal passed by the logical AND circuit 29, FIGS. 1 and 3, will be transmitted over conductor 41 to logical OR circuit 43 and from there over conductor 44 to logical AND circuit 46. It will be further assumed that latch 48 has been set to condition logical AND circuit 46. Hence, a signal over conductor 44 will be passed by the logical AND circuit 46 to the conductor 57. This signal will be passed onto the control ring 65 to cause the second stage, or latch 62, to become active.

Figures 5, 6:
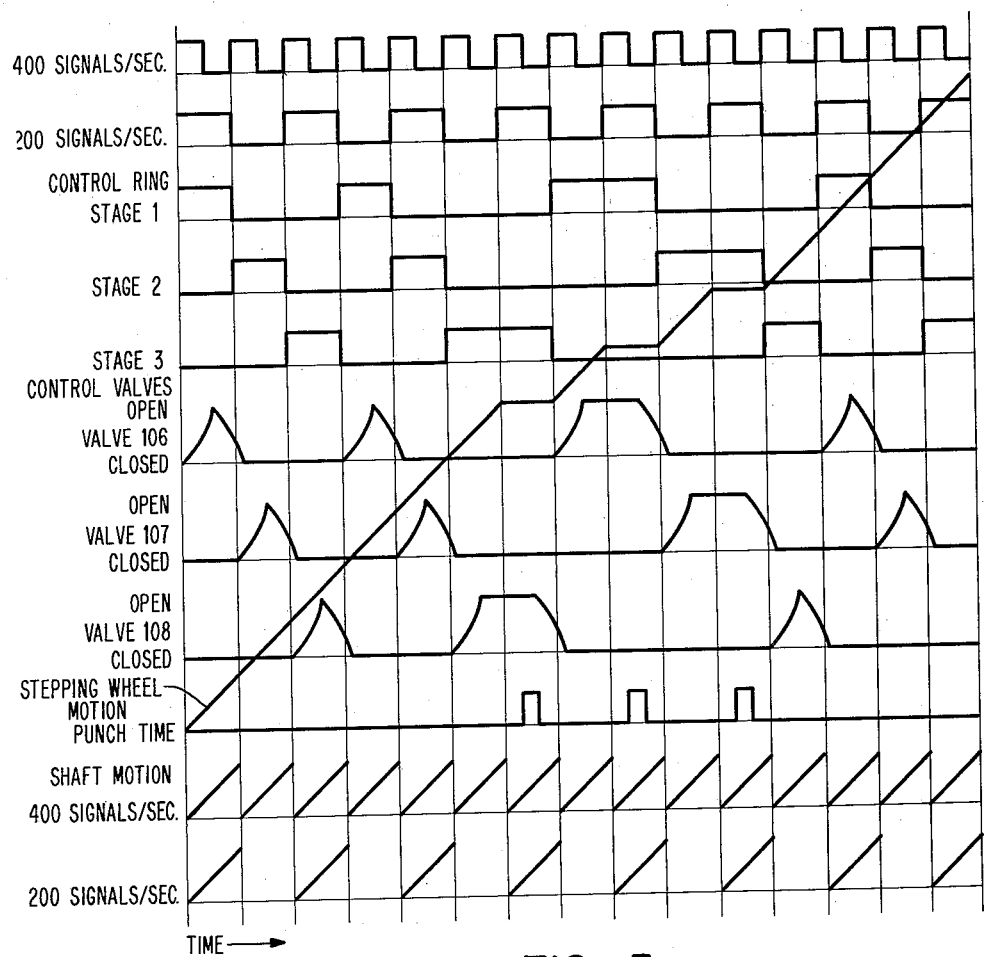
FIG. 5 is a timing diagram.
FIG. 6 is a diagram illustrating the states of the control magnets under various conditions.

With the second stage of the control ring active, magnets M2, M3 and M6 will be energized and magnets M1, M4 and M5 will be de-energized, as shown in FIG. 6. With the magnet M1 de-energized and the magnet M2 energized, the valve 106 in FIG. 2 will be shifted to the left to cut off fluid communication between conductors 110 and 111 and to place the fluid conductor 111 in fluid communication with the fluid conductor 112 which leads to the fluid reservoir 113. With magnet M3 energized and magnet M4 de-energized, the valve 107 will be shifted to the left to place the fluid conductor 114 in fluid communication with the fluid conductor 110. Hence, fluid passing via conductor 110 will be permitted to pass to conductor 114 to act upon driving piston 103. Driving piston 103 will thereby be actuated to advance stepping wheel 100. Since the states of magnets M5 and M6 have not been changed, the valve 108 will be held in the position shown in FIG. 2. The next signal occurring at the rate of 400 signals per second will shift the control ring so that stage 3, or latch 63, becomes active.

When stage 3 is active, magnets M2, M4 and M5 are energized while magnets M1, M3 and M6 are de-energized. Since the magnets M1 and M2 have not changed state under this condition, valve 106 will remain in the position where the fluid conductor 111 is in fluid communication with the fluid conductor 112. The states of magnets M3 and M4 are now reversed. Hence, valve 107 will be shifted to the right to the position shown in FIG. 2, whereby fluid conductor 114 will be in fluid communcation with fluid conductor 112. With magnet M5 energized, magnet M6 de-energized, the valve 108 will be shifted downwardly so that fluid conductor 116 is in fluid communication with fluid conductor 110 to permit fluid to pass from the pump 12 to act upon the driving piston 104. The driving piston 104 will advance the stepping wheel 100, and this motion takes place such that the motion of the stepping wheel in two successive increments occurring at the rate of 400 per second will be continuous motion, as seen in FIG. 5.

Let us assume that the program unit 37 of FIG. 1 or the program ring 180 of FIG. 3 is set so that latch 33 is switched to a state to condition logical AND circuit 32 to pass impulses occurring at the rate of 200 per second over conductor 31. The first electrical impulse occurring at 200 per second will be passed by the logical OR circuit 43 and logical AND circuit 46 to advance the control ring 65, whereby stage 1, or latch 61, becomes active. When stage 1 is active, magnets M1, M4 and M6 are energized while magnets M2, M3 and M5 are de-energized. With magnet M1 energized and magnet M2 de-energized, the valve 106 is shifted to the right to the position shown in FIG. 2. Hence, fluid conductor 111 will be in fluid communication with 110, whereby fluid will be permitted to act upon driving piston 102, which thereby advances stepping wheel 100. Control valve 107 will remain in its same position since the states of magnets M3 and M4 have not been changed. However, control valve 108 will be shifted upward because magnet M5 is de-energized and M6 is energized, as shown in FIG. 2.

Although signals occurring at the rate of 400 per second are applied to the logical AND circuit 29, it is not conditioned at this time and, hence, the control ring 65 will not be shifted until another electrical signal occurring at the rate of 200 per second, due to the trigger 27, is transmitted to advance the control ring 65. Hence, the stepping wheel 100 advances and then dwells for a period of time, the dwell period of time being equal to the advance period of time, as seen in FIG. 5. It is during the time that the stepping wheel dwells that punching occurs, as seen in FIG. 5. Since punching may occur in various fields of a card, the card may be advanced between fields at the higher speed where the stepping wheel is advanced in response to signals occurring at 400 per second. Continuous motion of the stepping wheel 100 is shown in FIG. 5. For example, the motion of the stepping wheel 100 in FIG. 5 may be interpreted that it is desired to skip five columns and then punch the next succeeding three columns and then skip to a new field, not shown, or to skip until the record card is out of the punching station.

From the foregoing, it is seen that the invention provides improved control apparatus for an incremental drive. Further, it is seen that improved control apparatus has been provided which enables an incremental drive to selectively start driving, stop driving, to drive and dwell and to drive and dwell continuously.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An output element adapted to be actuated so as to move incrementally; a plurality of actuators for incrementally actuating said output element, said actuators being adapted to operate successively in a predetermined sequence; power means for operating said actuators; a plurality of magnetic control elements successively operable to control the application of power to said actuators; electrical impulse generating means for providing a series of electrical impulses; an electronic ring having a plurality of stages, each having an output, said ring being adapted to be operated by said electrical impulses; first circuit means connecting said electronic ring under control of said electrical impulse generating means; a plurality of magnetic control element drivers for controlling the operation of said magnetic control elements; and second circuit means connecting the outputs of said stages of said electronic ring to corresponding magnetic control element drivers whereby said magnetic control element drivers are rendered operable to control said magnetic control elements in response to signals from the outputs of said stages.

2. Apparatus for controlling an incremental drive for a record feeding device comprising: a plurality of magnets operably connected to control said incremental drive, a plurality of selectively operable magnet drivers for selectively energizing said magnets, a control ring having a plurality of stages operably connected to control said magnet drivers, and means for controlling the operation of said control ring to selectively operate said magnet drivers in a fixed sequence at different predetermined rates.

3. In a record feeding device, an incremental drive adapted to advance records in different selected modes, a plurality of magnets operably connected to control said incremental drive in said different selected modes, a plurality of selectively operable magnet drivers for energizing said magnets in a manner to control said incremental drive in said different selected modes, a control ring having a plurality of stages connected to control said magnet drivers, and means for controlling the operation of said control ring to selectively operate said magnet drivers in a fixed sequence at different predetermined rates.

4. Apparatus comprising: a stepping wheel having a plurality of arcuately spaced teeth; a plurality of fluid operated driving pistons, each being adapted to engage the teeth of the stepping wheel to advance the same; a plurality of control valves for controlling the application of fluid under pressure to said driving pistons; a plurality of magnets connected to operate said control valves; a plurality of selectively operable magnet drivers for energizing said magnets; a control ring having a plurality of stages connected to control said magnet drivers; and means for controlling the operation of said control ring to selectively operate said magnet drivers in a fixed sequence.

5. Apparatus comprising: first and second signal sources of electrical control signals occurring in time at first and second rates; first and second logical AND circuits; first and second circuit means connecting said first and second signal sources to said first and second logical AND circuits; means for selectively conditioning said first and second logical AND circuits to pass signals from said signal sources, only one of said first and second logical AND circuits being conditioned at any one time; a control ring having a plurality of stages; and means connecting the advancement of said control ring under control of said first and second logical AND circuits, whereby said control ring is selectively advanced at said first and second rates depending upon whether the first or second logical AND circuit is conditioned.

6. Apparatus comprising: an incremental drive, a plurality of magnets operably connected to control said incremental drive, a plurality of selectively operable magnet drivers for selectively energizing said magnets, a control ring having a plurality of stages connected to control said magnet drivers, and means for selectively advancing said control ring at selected frequencies to selectively operate said incremental drive.

7. Apparatus comprising: an incremental drive, a plurality of magnets operably connected to control said incremental drive, a plurality of selectively operable magnet drivers for selectively energizing said magnets, a control ring having a plurality of stages connected to control said magnet drivers, a plurality of sources of electrical control signals occurring in time at a plurality of rates, and means for selectively applying said plurality of sources of electrical control signals to said control ring so as to advance the same at said plurality of rates whereby said magnet drivers control said magnets at said plurality of rates to control said incremental drive at said plurality of rates.

8. Apparatus comprising: a stepping wheel having a plurality of arcuately spaced teeth; a plurality of fluid operated driving pistons, each being adapted to engage the teeth of the stepping wheel to advance the same; a plurality of control valves for controlling the application of fluid under pressure to said driving pistons; a plurality of magnets connected to operate said control valves; a plurality of selectively operable magnets drivers for energizing said magnets; a control ring having a plurality of stages connected to control said magnet drivers; and means for selectively advancing said control ring at selected frequencies.

9. Apparatus comprising: a stepping wheel having a plurality of arcuately spaced teeth; a plurality of fluid operated driving pistons, each being adapted to engage the teeth of the stepping wheel to advance the same; a plurality of control devices for controlling the application of fluid under pressure to said driving pistons; a plurality of magnets connected to operate said control valves; a plurality of selectively operable magnet drivers for energizing said magnets; a control ring having a plurality of stages connected to control said magnet drivers; a plurality of signal sources of electrical control signals occurring in time at a plurality of rates; and means for selectively applying said plurality of sources of electrical control signals to said control ring so as to advance the same at said plurality of rates whereby said magnet drivers control said magnets to control said control valves at said plurality of rates.

10. Apparatus comprising: first and second signal sources of electrical control signals occurring in time at first and second rates; first and second logical AND circuits; first and second circuit means connecting said first and second signal sources to said first and second logical AND circuits; a program ring having a plurality of stages being connected to said first and second logical AND circuits to condition the same for passing signals from said signal sources; means for selectively applying control signals from said first and second signal sources to said program ring to advance the same; a control ring having a plurality of stages; means for connecting the advancement of said control ring under control of said first and second logical AND circuits whereby said control ring is selectively advanced at said first and second rates, depending upon whether the first or second logical AND circuit is conditioned; an incremental drive; a plurality of magnets operably connected to control said incremental drive; a plurality of selectively operable magnet drivers for selectively energizing said magnets; and circuit means connecting said magnet drivers under control of the plurality of stages of said control ring.

No references cited.